United States Patent [19]

Schiel

[11] Patent Number: 4,807,665

[45] Date of Patent: Feb. 28, 1989

[54] ELECTROMAGNETICALLY ACTUATABLE THREE-WAY/TWO-POSITION VALVE

[75] Inventor: Lotha Schiel, Hofheim, Fed. Rep. of Germany

[73] Assignee: Alfred Teves GmbH, Frankfurt am Main, Fed. Rep. of Germany

[21] Appl. No.: 141,190

[22] Filed: Jan. 6, 1988

[30] Foreign Application Priority Data

Jan. 7, 1987 [DE] Fed. Rep. of Germany ....... 3700219

[51] Int. Cl.$^4$ .............................................. F16K 11/02
[52] U.S. Cl. ............................ 137/625.4; 137/625.44; 137/875
[58] Field of Search .............. 137/625.44, 875, 625.21, 137/625.65, 625.4

[56] References Cited

U.S. PATENT DOCUMENTS

| | | | |
|---|---|---|---|
| 3,228,653 | 1/1966 | Trimmer | 137/625.44 X |
| 3,613,548 | 10/1971 | Motts | 137/625.44 X |
| 4,108,206 | 8/1978 | Mountain | 137/875 X |
| 4,285,497 | 8/1981 | Guttel | 137/875 X |
| 4,388,950 | 6/1983 | Stouffer | 137/875 X |

FOREIGN PATENT DOCUMENTS 137345 9/1952 Sweden ......................... 137/625.44

Primary Examiner—Alan Cohan
Attorney, Agent, or Firm—James B. Raden

[57] ABSTRACT

Disclosed is an electromagnetically actuatable three-way/two-position valve for alternatively connecting an outlet connection with a first or a second inlet connection. The valve includes a housing having a cavity which is sealed by means of a cap and within which a magnet winding and a displaceably arranged armature are provided which, upon excitation of the winding, actuates a valve closing body which is preloaded into an inoperative position by means of a return spring supported against the housing. A communication between the first inlet connection and the outlet connection exists in the inoperative position. In order to interconnect relatively large cross-sections in a reliable manner by using a conventional electromagnet and without the necessity of an auxiliary energy source, the present invention provides that the two inlet connections have a common axis of symmetry and between the two inlet connections there is a connection area within which the outlet connection is connected to the inlet connections and the valve closing body is swivel-mounted around a swivelling axis. Two sealing seat pairs which are releasably engagable by the valve closing body are provided with the sealing seats of the sealing seat pairs being symmetrically distributed within the connection area, at an equal distance from the swivelling axis of the valve closing body.

8 Claims, 1 Drawing Sheet

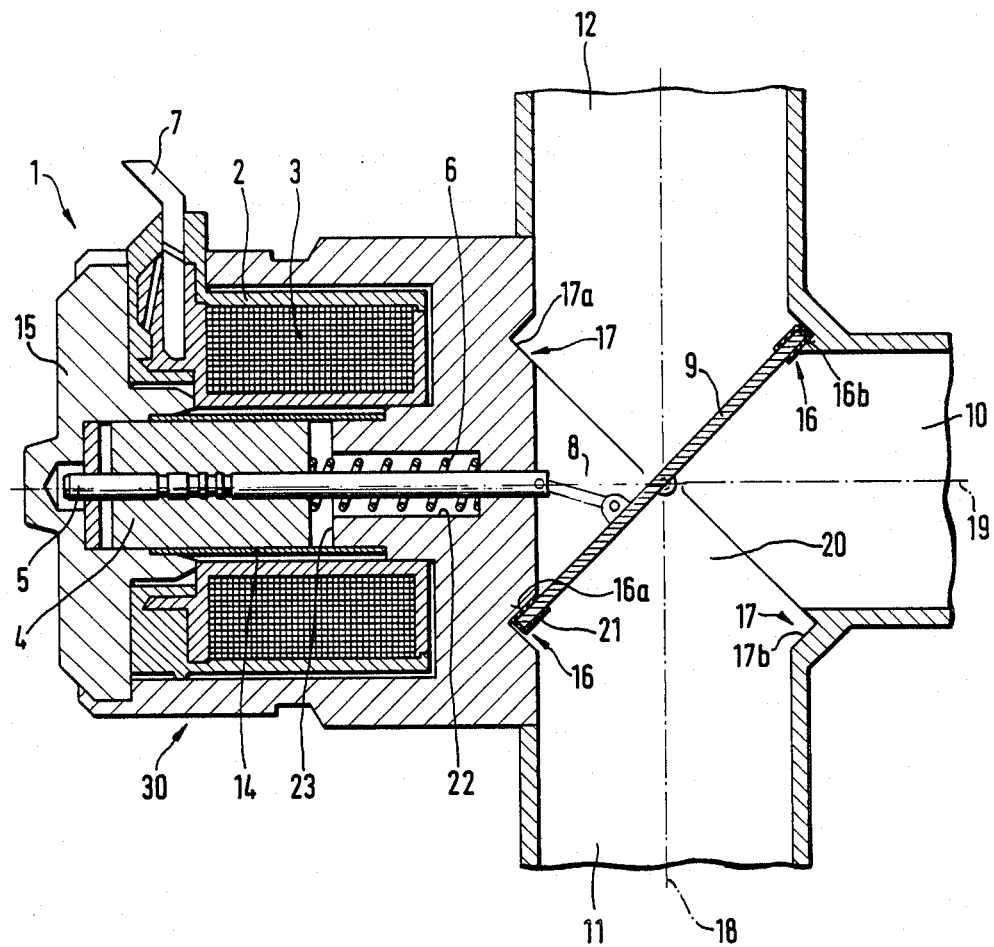

ELECTROMAGNETICALLY ACTUATABLE THREE-WAY/TWO-POSITION VALVE

BACKGROUND OF THE INVENTION

The present invention relates to an electromagnetically actuatable three-way/two-position valve for alternatively connecting an outlet connection with a first or a second inlet connection. More particularly, the invention relates to a valve of the type having a housing which is closed by means of a cap and wherein a magnet winding and a displaceably arranged armature are provided. Upon excitation, the electromagnet actuates a valve closing body which is preloaded into an inoperative position by means of a return spring supported in the housing. Communication between the first inlet connection and the outlet connection is established in the inoperative position of the valve.

Such a valve is shown in the printed paper published by Mac Valves Europe, Inc. of Belguim and Mac Valves, Inc. of Wixom, Mich. This printed paper discloses the Mac 56 Series 2 & 3-way, solenoid pilot and remote air pilot valve. The three-way valve disclosed in that paper is provided with a first electromechanically actuatable control piston which controls the supply of a pressurized pressure medium, such as compressed air, to a second piston. The second piston is sealedly guided in a bore and has two sealing edges which cooperate with two sealing seats to establish a connection between a first and/or a second and a third connection.

This three-way valve has the shortcoming that it it necessary to provide an auxiliary energy source (compressed air source) for connecting relatively large cross-sections either with a vacuum and/or with the atmosphere.

SUMMARY OF THE INVENTION

It is, therefore, the object of the present invention to provide an electromagnetically actuatable three-way/two-position valve of the type referred to wherein relatively large cross-sections can be reliably connectable by using a conventional electromagnet and without the necessity of an auxiliary energy source. The valve according to the invention has a simple design, is easily produceable in production and includes component parts which can be manufactured at low cost.

According to the present invention, this object is achieved in that the two inlet connections have a common axis of symmetry and, between the two inlet connections, a connection area is provided within which an outlet connection is connected to the inlet connections. According to an important feature, the valve closing body is swivel-mounted around a swivelling axis and two pairs of sealing seats which are lockable and/or releasable by means of the valve closing body are provided. According to another feature of the invention, the sealing seats of the sealing seat pairs are symmetrically distributed within the connection area at an equal distance from the swivelling axis of the valve closing body. Advantageously, the invention enables the desired switching operations to be carried out by using a relatively small weak electromagnet, and further enables more exact determination of the valve closing force and utilization of the available magnet stroke.

According to a further feature of the invention, the valve closing body is eccentrically articulated to an actuating element connected with the armature. Accordingly an exact tuning of the valve closing force and of the available stroke of the electromagnet is possible.

Another advantageous feature of the present invention provides for the valve closing body to be articulated to the actuating element by means of a valve actuating tappet which is swivel-mounted both at the actuating element and at the valve closing body. Advantageously, a particularly simple, very reliably working connection between the electromagnet and the valve closing body is achieved. An exact guiding of the actuating element within the housing is ensured irrespective of the position of the valve closing body.

In order to eliminate noises generated on actuation of the three-way/two-position valve according to the invention, the valve closing body is provided with an elastic layer on its edge which cooperates with the sealaing seat pairs.

According to a still further advantageous feature of the present invention, the axis of the outlet connection and the axis of symmetry of the two inlet connections form a right angle. Accordingly, considerable flow advantages are achieved due to the same diversion of the two flows generated between the inlet connections and the outlet connection.

In order to achieve particularly favorable flow conditions, another feature of the present invention provides for the two inlet connections as well as the outlet connection to have identical areas of cross-section and the sealing seat pairs are arranged so as to be turned by 90° with the sealing seats facing each other.

The valve closing body has its first inlet connection connected to a vacuum source and the second inlet connection communicates with the atmosphere. In order to relieve the valve closing body from a pressure differential acting thereupon, the present invention provides for the valve closing body to be centrally swivel-mounted.

However, in order to be able to utilize the effect of the aforementioned pressure differential to increase the tightness of the inventive three-way/two-position valve in the inoperative position, if required, the valve closing body can be eccentrically swivel-mounted so that a force component generated in the event of a pressure differential acting thereupon boosts the effect of the return spring which preloads the valve closing body into the inoperative position.

BRIEF DESCRIPTION OF THE DRAWING

The invention will be better understood after reading the following Detailed Description of the Preferred Embodiment in conjunction with the drawing which is a longitudinal cross-section of a three-way/two-position valve according to the invention.

DETAILED DESCRIPTION OF A PREFERRED EMBODIMENT

The electromagnetically actuatable three-way/two-position valve illustrated in the drawing includes a first inlet connection 11, a second inlet connection 12 as well as an outlet connection 10 the arrangement of which has, in the embodiment shown, been preferably chosen such that the two inlet connections 11, 12 have a common axis of symmetry 18 which forms a right angle with the axis 19 of the outlet connection 10. The first inlet connection 11 is a vacuum connection and the second inlet connection 12 is an atmosphere connection. All three connections 10, 11, 12 have cross-sectional areas of equal size. The transition where the three connections 10, 11, 12 join into one another forms a connection area 20 wherein a first sealing seat pair 16 defined by the sealing seats 16a, 16b and a second sealing seat pair 17 defined by the sealing 17a, 17b. A valve closing body 9, which cooperates with the two sealing seat pairs 16, 17, is also arranged in the connection area 20. The valve closing body 9 which is, in the embodiment shown, swivel-mounted at the point of intersection of the two axes of symmetry 18 and 19, and is preferably provided with an elastic layer 21 on its edge which tightly abuts on the sealing seat pairs 16, 17. The elastic layer ensures a better seal of the sealing seats 16a, 16b, 17a, 17b and provides for considerable noise reduction during the switching operations.

For the actuation of the valve closing body 9, there is provided a valve actuating tappet 8, one end of which is pivotally articulated to the valve closing body 9 and the other end of which is pivotally connected to an actuating element 5. The actuating element 5 is actuated by means of an electromagnet 30. The electromagnet 30 includes a housing 1 having a stepped central bore which is sealed closed by a cap 15. The interior of the housing 1 accommodates a magnet winding carrier 2 with a magnet winding 3 wound around the carrier. The magnet winding 3 is connected to a suitable electrical source by means of associated contact lugs 7 and it serves to displace an armature 4 which is interconnected with the actuating element 5. Movement of the armature 4 is guided by a guiding sleeve 14 in which the armature is received. Between the inner end face of the armature 4, that is, the end spaced away from the cap 15, and the bottom of a blind-end bore 22 provided in the housing 1, there is provided a return spring 6. The stroke of the armature is confined by means of a radial stop surface 23 arranged in the housing 1 and formed by the stepped bore.

The mode of operation of the electromagnetically actuatable three-way/two-position valve according to the invention is as follows:

When the electromagnet 30 is not excited, the valve closing body 9 assumes the inoperative position illustrated in the drawing due to the effect of the return spring 6. In this position the first inlet connection 11 and the outlet connection 10 are in communication. If a voltage is applied across the magnet winding 3, the armature 4 is acted upon by a magnetic force which must exceed the return force generated by the return spring 6. Under the effect of the magnetic force, the armature 4 moves to the right, as shown in the drawing, and forces the actuating element 5 to move in the same direction. Accordingly, the valve actuating tappet 8 is also moved to the right, as viewed in the drawing, displacing the valve closing body 9 to tip over into the other closed position. A connection between the second inlet connection 12 and the outlet connection 10 is thus established. When the voltage across the magnet winding 3 is cut off or in the event of a pressure differential acting upon the valve closing body 9, the body 9 returns to the inoperative position shown in the drawing since the armature 4 and actuating element 5 are moved back to the left, as viewed in drawing, by the spring 6.

What is claimed is:

1. An electromagnetically actuatable three-way/two-position valve for alternatively connecting an outlet connection with a first or a second inlet connection, comprising a housing having a central cavity, an electromagnet in said housing including a magnet winding and an armature in said cavity arranged for displacement upon excitation of the magnet winding, a valve closing body operatively connected to said armature and preloaded into an inoperative position by a return spring supported against the housing, a communication existing between the first inlet connection and outlet connection in an inoperative position of said electromagnet, the two inlet connections have a common axis of symmetry, a connection area provided between the two inlet connections, the outlet connection being connected to the inlet connections at the connection area, the valve closing body being centrally pivotally-mounted around a pivot axis located on said axis of symmetry of said first and second inlet connections, two sealing seat pairs of symmetrically distributed within the connection area at an equal distance from the pivot axis of the valve closing body, said sealing seat pairs releasably engageable by said valve closing body.

2. The electromagnetically actuatable three-way/two-position valve according to claim 1 wherein the valve closing body is eccentricaly articulated to an actuating element associated with the armature.

3. The electromagnetically actuatable three-way/two-position valve according to claim 2 wherein the valve closing body is articulated to the actuating element by means of a valve actuating tappet which is swivel-mounted to the actuating element and to the valve closing body.

4. The electromagnetically actuatable three-way/two-position valve according to claim 1 wherein the valve closing body is provided with an elastic layer on an edge cooperating with the sealing seat pairs.

5. The electromagnetically actuatable three-way/two-position valve according to claim 1 wherein the axis of the outlet connection forms a right angle with the axis of the two inlet connections.

6. The electromagnetically actuatable three-way/two-position valve according to claim 5 wherein the two inlet connections and the outlet connection have identical areas of cross-section, the sealing seat pairs are arranged so as to be oriented at right angles and the sealing seats so as to face each other.

7. The electromagnetically actuatable three-way/two-position valve according to claim 1 wherein the valve closing body is centrically swivel-mounted.

8. The electromagnetically actuatable three-way/two-position valve according to claim 1 wherein the first inlet connection is a vacuum connection and the second inlet connection is an atmosphere connection wherein the valve closing body is eccentrically swivel-mounted so that a force component generated in the event of a pressure differential acting thereupon boosts the effect of the return spring which preloads the valve closing body into the inoperative position.

* * * * *